(12) United States Patent
Herfindahl et al.

(10) Patent No.: US 10,802,463 B1
(45) Date of Patent: *Oct. 13, 2020

(54) METHOD OF PRINTING A TAG AND ATTACHING THE TAG TO A BAG

(71) Applicants: Robert Herfindahl, Maple Grove, MN (US); Matthew Benner, Maple Grove, MN (US); Eric Sorensen, Maple Grove, MN (US); Lamar Sorensen, Maple Grove, MN (US)

(72) Inventors: Robert Herfindahl, Maple Grove, MN (US); Matthew Benner, Maple Grove, MN (US); Eric Sorensen, Maple Grove, MN (US); Lamar Sorensen, Maple Grove, MN (US)

(73) Assignee: CMSI Technologies, Maple Grove, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,031

(22) Filed: Jan. 23, 2018

Related U.S. Application Data

(60) Provisional application No. 62/579,692, filed on Oct. 31, 2017.

(51) Int. Cl.
*G05B 19/402* (2006.01)
*B65G 43/08* (2006.01)
*B65G 51/03* (2006.01)

(52) U.S. Cl.
CPC .......... *G05B 19/402* (2013.01); *B65G 43/08* (2013.01); *B65G 51/03* (2013.01); *B65G 2201/0238* (2013.01); *B65G 2203/0208* (2013.01); *B65G 2203/047* (2013.01); *G05B 2219/45054* (2013.01); *G05B 2219/4705* (2013.01)

(58) Field of Classification Search
CPC ........ G05B 19/402; G05B 2219/45054; G05B 2219/4705; B65G 43/08; B65G 51/03; B65G 2201/0238; B65G 2203/0208; B65G 2203/047
See application file for complete search history.

(56) References Cited

U.S. PATENT DOCUMENTS

| 2,614,714 | A | * | 10/1952 | Erhardt, Jr. | A43D 100/02 112/323 |
| 5,479,757 | A | * | 1/1996 | Ogawa | B65B 61/20 156/556 |
| 2011/0139589 | A1 | * | 6/2011 | Agnoff | B65G 13/07 198/788 |

(Continued)

FOREIGN PATENT DOCUMENTS

JP  57157778 A * 9/1982 ............. B41J 15/00

*Primary Examiner* — Thomas C Lee
*Assistant Examiner* — Michael Tang
(74) *Attorney, Agent, or Firm* — Vidas Arrett & Steinkraus P.A.

(57) ABSTRACT

A method of printing a tag and attaching the tag to a bag for printing, severing and feeding non-curled tags to sewing machines. The method of printing a tag and attaching the tag to a bag comprising providing a control unit, a bag conveyor, a bag switch, a printer unit, a chute, a chute sensor, and a feeder assembly; printing and severing a tag in the printer unit; dispensing the tag into the chute to prevent the tag from curling and jamming; and feeding the tag to a sewing machine whereupon the tag is attached to a bag.

11 Claims, 2 Drawing Sheets

(56) References Cited

U.S. PATENT DOCUMENTS

2015/0273882 A1* 10/2015 Akahori ............... B41J 11/0015
  347/16
2019/0047738 A1* 2/2019 Nishimura ................ B65C 9/30

\* cited by examiner

METHOD OF PRINTING A TAG AND ATTACHING THE TAG TO A BAG

BACKGROUND OF THE INVENTION

Field of the Invention

The present invention relates to tag assemblies and more particularly pertains to a new method of printing a tag and attaching the tag to a bag for printing, severing and feeding non-curled tags to sewing machines.

Description of the Prior Art

The use of tag assemblies is known in the prior art. More specifically, tag assemblies heretofore devised and utilized are known to consist basically of familiar, expected and obvious structural configurations, notwithstanding the myriad of designs encompassed by the crowded prior art which have been developed for the fulfillment of countless objectives and requirements.

The prior art includes tag assemblies which print individual tag which are not directly fed to sewing machine. While these devices fulfill their respective, particular objectives and requirements, the aforementioned patents do not disclose a new method of printing a tag and attaching the tag to a bag.

SUMMARY OF THE INVENTION

The general purpose of the present invention, which will be described subsequently in greater detail, is to provide a new method of printing a tag and attaching the tag to a bag which has many of the advantages of the tag assemblies mentioned heretofore and many novel features that result in a new method of printing a tag and attaching the tag to a bag which is not anticipated, rendered obvious, suggested, or even implied by any of the prior art tag assemblies, either alone or in any combination thereof. The present invention includes providing a control unit, a bag conveyor, a bag switch, a printer unit, a chute, a chute sensor, and a feeder assembly; printing and severing a tag in the printer unit; dispensing the tag into the chute to prevent the tag from curling and jamming; and feeding the tag to a sewing machine whereupon the tag is attached to a bag. None of the prior art includes the combination of the elements of the present invention.

There has thus been outlined, rather broadly, the more important features of the method of printing a tag and attaching the tag to a bag in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new method of printing a tag and attaching the tag to a bag which has many of the advantages of the tag assemblies mentioned heretofore and many novel features that result in a new method of printing a tag and attaching the tag to a bag which is not anticipated, rendered obvious, suggested, or even implied by any of the prior art tag assemblies, either alone or in any combination thereof.

Still another object of the present invention is to provide a new method of printing a tag and attaching the tag to a bag for printing, severing and feeding non-curled tags in unison to sewing machines.

Still yet another object of the present invention is to provide a new method of printing a tag and attaching the tag to a bag that continuously feeds printed tags to a sewing machine which sews the tags to the packaging.

Even still another object of the present invention is to provide a new method of printing a tag and attaching the tag to a bag that prevents the tag from being curled and can be adjusted to print on any size tag.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawing wherein.

DETAILED DESCRIPTION OF THE INVENTION

Figure 1:
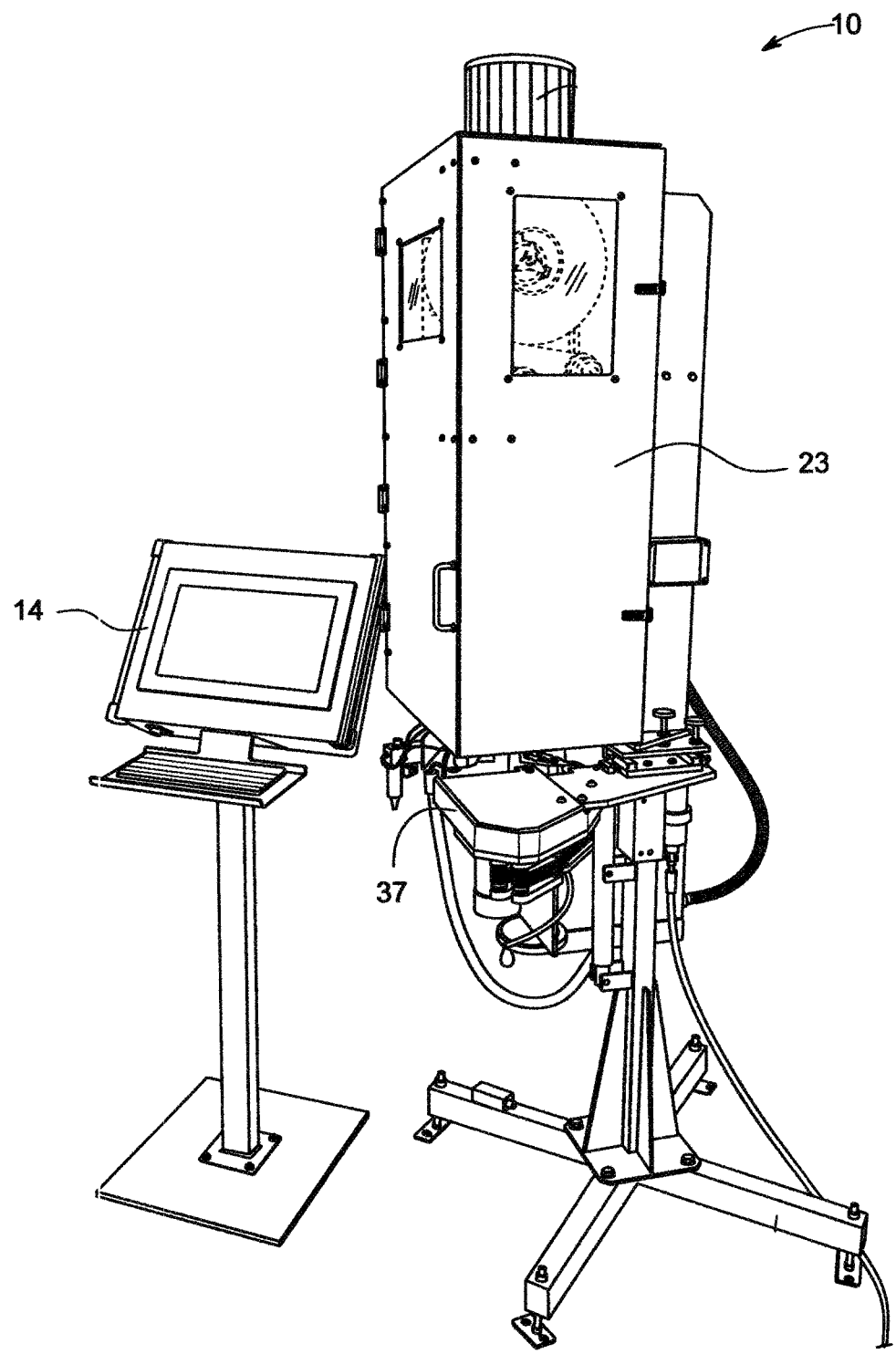
FIG. 1 is a block diagram of a new method of printing a tag and attaching the tag to a bag according to the present invention.
Figure 2:
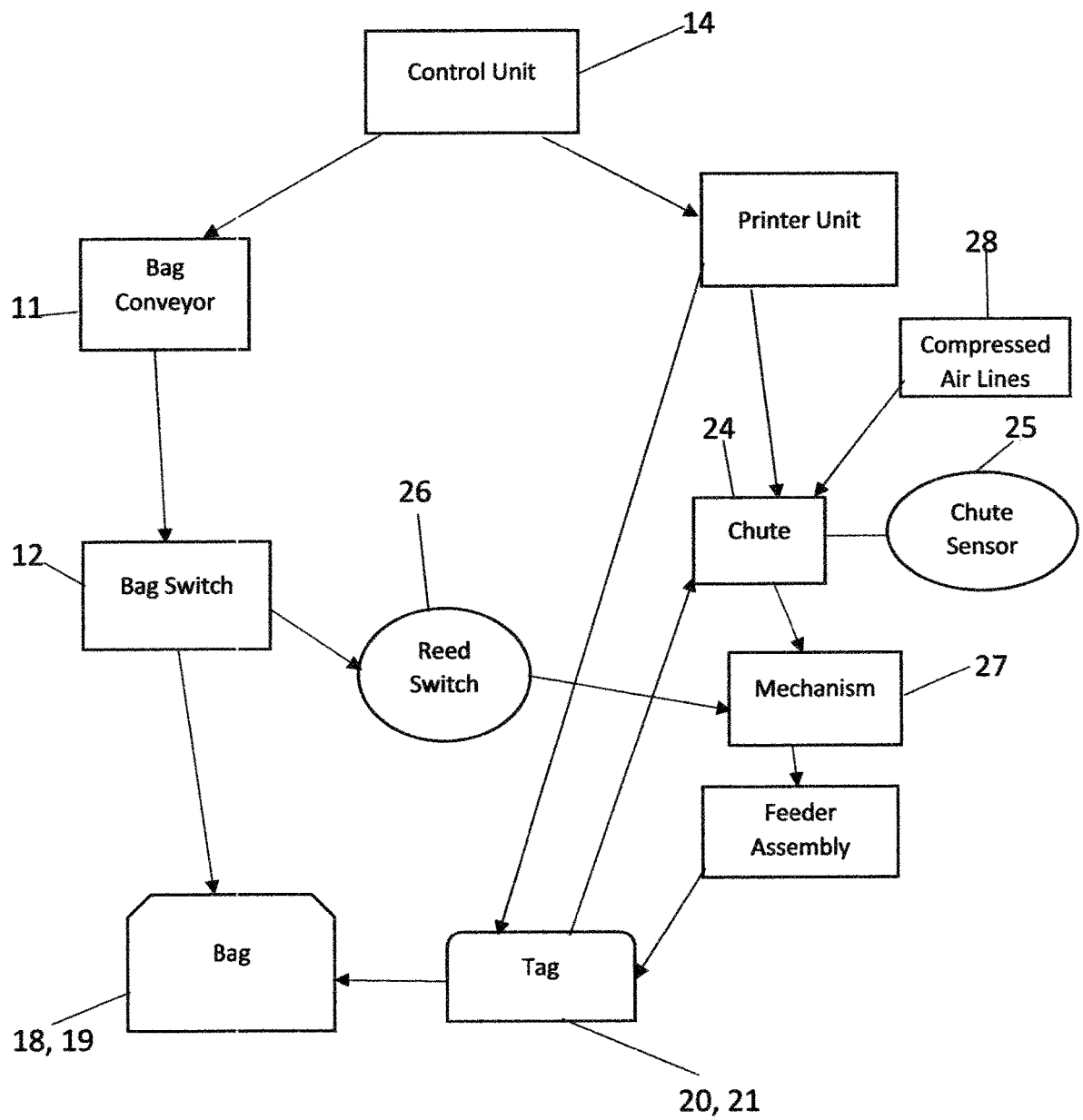
FIG. 2 is a perspective view of the printer unit and feeder assembly used in the present invention.

With reference now to the drawing, and in particular to FIGS. 1 and 2 thereof, a new method of printing a tag and attaching the tag to a bag embodying the principles and concepts of the present invention will be described.

As best illustrated in FIGS. 1 and 2, the method of printing a tag and attaching the tag to a bag generally comprises providing a control unit 14, a bag conveyor 11, a bag switch 12, a printer unit 23, a chute 24, a chute sensor 25, and a feeder assembly 37; printing and severing a tag 20 in the printer unit 22, dispensing the tag 20 into the chute 24 to prevent the tag 20 from curling and jamming; and feeding the tag 20 to a sewing machine whereupon the tag 20 is attached to a bag 18.

The method of printing the tag and attaching the tag to the bag 10 also comprises compressed air lines 28 for dispensing compressed air into the chute 24. Compressed air is conventionally applied to the tag 20 in the chute 24 to prevent curling and jamming of the tag 20. The control unit 14 effects movement of the bag 18 upon the bag conveyor 11 conventionally tripping the bag switch 12 causing the tag 20 to be moved from the chute 24 to the feeder assembly 37 and into contact with the bag 18 whereupon the tag 20 is conventionally attached to the bag 18. A reed switch 26 is in conventional communication with a mechanism 27 such as a plunger for conventionally energizing the mechanism 27 to move the tag 20 from the chute 24 to the feeder assembly 37. The bag switch 12 is in operational and conventional communication with the reed switch 26 and upon the bag 13 tripping the bag switch 12 the bag switch conventionally signals the reed switch 26 which conventionally activates the mechanism 27 which moves the tag 20 from the chute 24 to the feeder assembly 37. Upon the tag 20 being moved to the feeder assembly 37, the chute sensor 25 detects the chute 24 to be empty. Upon detecting the chute 24 being empty, the chute sensor 25 triggers printing and severing a next tag 17 by the printer unit 23 and dispensing the next tag 21 into the chute 24. A next bag 19 is conventionally moved upon the bag conveyor 11 and conventionally trips the bag switch 12 causing the next tag 19 to be moved from the chute 24 to the feeder assembly 37 and into contact with the next bag 19 whereupon the next tag 21 is conventionally attached and sewn to the next bag 19.

The control unit 14 shuts down the printer unit 23, the bag conveyor 11 and the feeder assembly 37 upon the bag 18, 19 not tripping the bag switch 12 or upon the tag 20, 21 not being printed and dispensed into the chute 24 or upon the tag 20, 22 not being moved from the chute 24 to the feeder assembly 37.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the method of printing a tag and attaching the tag to a bag. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of printing a tag and attaching the tag to a bag comprising:
    providing a control unit, a bag conveyor, a bag switch, a printer unit, a chute, a chute sensor, and a feeder assembly and further including compressed air lines for dispensing compressed air into the chute;
    printing and severing a tag in the printer unit;
    dispensing the tag into the chute and applying compressed air to the tag in the chute to prevent the tag from curling and jamming; and
    feeding the tag to a sewing machine whereupon the tag is attached to a bag.

2. The method of printing the tag and attaching the tag to the bag as described in claim 1 also comprising the control unit effecting movement of a bag upon the bag conveyor with the bag tripping the bag switch causing the tag to be moved from the chute to the feeder assembly and into contact with the bag whereupon the tag is attached to the bag.

3. The method of printing the tag and attaching the tag to the bag as described in claim 2 further comprising a reed switch in communication with a mechanism for energizing the mechanism to move the tag from the chute to the feeder assembly.

4. The method of printing the tag and attaching the tag to the bag as described in claim 3, wherein the bag switch is in communication with the reed switch and upon the bag tripping the bag switch the bag switch signals the reed switch.

5. The method of printing the tag and attaching the tag to the bag as described in claim 4, wherein the reed switch activates the mechanism which moves the tag from the chute to the feeder assembly.

6. The method of printing the tag and attaching the tag to the bag as described in claim 3 also comprising upon the tag being moved to the feeder assembly, the chute sensor detects the chute to be empty.

7. The method of printing the tag and attaching the tag to the bag as described in claim 6 further comprising upon detecting the chute being empty, the chute sensor triggers printing and severing the next tag by the printer unit and dispensing the next tag into the chute.

8. The method of printing the tag and attaching the tag to the bag as described in claim 7 also comprising the control unit effecting movement of a next bag upon the bag conveyor with the bag tripping the bag switch causing the next tag to be moved from the chute to the feeder assembly and into contact with the next bag whereupon the next tag is attached to the next bag.

9. The method of printing the tag and attaching the tag to the bag as described in claim 8 further comprising the control unit shutting down the printer unit, the bag conveyor and the feeder assembly upon the bag not tripping the bag switch.

10. The method of printing the tag and attaching the tag to the bag as described in claim 8 also comprising the control unit shutting down the printer unit, the bag conveyor and the feeder assembly upon the tag not being printed and dispensed into the chute.

11. The method of printing the tag and attaching the tag to the bag as described in claim 8 further comprising the control unit shutting down the printer unit, the bag conveyor and the feeder assembly upon the tag not being moved from the chute to the feeder assembly.

\* \* \* \* \*